United States Patent
Higashide et al.

(10) Patent No.: US 12,067,512 B2
(45) Date of Patent: Aug. 20, 2024

(54) INFORMATION PROCESSING APPARATUS FOR LENDING AND BORROWING VEHICLES BETWEEN AREAS, NON-TRANSITORY COMPUTER READABLE MEDIUM, AND INFORMATION PROCESSING METHOD

(71) Applicants: TOYOTA JIDOSHA KABUSHIKI KAISHA, Toyota (JP); DENSO CORPORATION, Kariya (JP)

(72) Inventors: Hiroshi Higashide, Nagoya (JP); Keiichi Uno, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 54 days.

(21) Appl. No.: 17/719,880

(22) Filed: Apr. 13, 2022

(65) Prior Publication Data

US 2022/0343246 A1    Oct. 27, 2022

(30) Foreign Application Priority Data

Apr. 21, 2021 (JP) ................................ 2021-072058

(51) Int. Cl.
*G06Q 10/0631* (2023.01)
*G06Q 30/0207* (2023.01)
(Continued)

(52) U.S. Cl.
CPC ... *G06Q 10/06315* (2013.01); *G06Q 30/0207* (2013.01); *G08G 1/123* (2013.01); *G08G 1/202* (2013.01)

(58) Field of Classification Search
CPC ......... G06Q 10/06315; G06Q 30/0207; G08G 1/123; G08G 1/202
See application file for complete search history.

(56) References Cited

U.S. PATENT DOCUMENTS 6,317,720 B1 * 11/2001 Murakami ............. G06Q 10/02
                                                                705/13
6,832,092 B1 * 12/2004 Suarez .................. H04W 84/08
                                                                455/456.6
(Continued)

FOREIGN PATENT DOCUMENTS

CN    108564225 A  *  9/2018  ............. G06Q 10/04
JP    2014-186645 A    10/2014
(Continued)

OTHER PUBLICATIONS

Aalami et al. "Fair Dynamic Resource Allocation in Transit-bsed Evacuation Planning" (2017) (Transportation Research Procedia 23 (2017) 400-419) (Year: 2017).*

*Primary Examiner* — Sujay Koneru
(74) *Attorney, Agent, or Firm* — Sughrue Mion, PLLC (57) ABSTRACT

An information processing apparatus includes a controller that acquires, from vehicle dispatch centers that each manage an operation plan for a specific area, the operation plan for each area, determines, based on the acquired operation plans, whether a period of time exists, in non-adjacent first and second areas, during which there is a surplus of vehicles in the first area and a shortage of vehicles in the second area, and generates, when the period of time is determined to exist, a vehicle movement plan such that a surplus vehicle in the first area is lent to a vehicle dispatch center that manages an operation plan for an area between the first and second areas, and a vehicle dispatch center in the second area borrows a vehicle from the vehicle dispatch center that manages the operation plan for the area between the first and second areas.

11 Claims, 5 Drawing Sheets

(51) Int. Cl.
*G08G 1/00* (2006.01)
*G08G 1/123* (2006.01)

(56) References Cited

U.S. PATENT DOCUMENTS

| | | | |
|---|---|---|---|
| 7,089,265 B1* | 8/2006 | Jain | G06F 16/2358 707/613 |
| 8,005,937 B2* | 8/2011 | Wesley, Sr. | G06F 8/65 709/230 |
| 10,142,255 B1* | 11/2018 | Pachon | G08G 1/202 |
| 10,453,107 B2* | 10/2019 | Roche | G06Q 10/02 |
| 10,679,311 B2* | 6/2020 | Mohr | G06Q 10/08 |
| 11,562,301 B1* | 1/2023 | Brannan | G08G 1/202 |
| 2002/0082893 A1* | 6/2002 | Barts | G06Q 10/0834 705/334 |
| 2002/0124103 A1* | 9/2002 | Maruyama | H04L 47/10 709/228 |
| 2006/0178812 A1* | 8/2006 | Affleck | G06Q 10/08 701/533 |
| 2007/0087756 A1* | 4/2007 | Hoffberg | G06Q 10/06375 455/450 |
| 2011/0289013 A1* | 11/2011 | Deck | G06Q 50/30 705/333 |
| 2014/0207498 A1* | 7/2014 | Cho | G06Q 10/02 705/5 |
| 2016/0042303 A1* | 2/2016 | Medina | G06Q 50/40 705/5 |
| 2016/0335576 A1* | 11/2016 | Peng | G06Q 10/06315 |
| 2016/0379167 A1* | 12/2016 | Raman | G06Q 10/1097 705/338 |
| 2019/0019145 A1* | 1/2019 | Kim | G06Q 40/08 |
| 2019/0057479 A1* | 2/2019 | Li | G06Q 10/06315 |
| 2019/0122561 A1* | 4/2019 | Shimizu | G01C 21/3469 |
| 2019/0126766 A1* | 5/2019 | Taguchi | G06Q 50/30 |
| 2019/0193764 A1* | 6/2019 | Cooper | B61L 17/00 |
| 2019/0205797 A1* | 7/2019 | Sakurada | G07C 9/21 |
| 2019/0318629 A1* | 10/2019 | Ranjan | G08G 1/202 |
| 2020/0104912 A1* | 4/2020 | Malliah | G06F 16/29 |
| 2020/0143296 A1* | 5/2020 | Mizuno | G08G 1/123 |
| 2020/0342559 A1* | 10/2020 | Fujinoi | B65G 1/00 |
| 2020/0372590 A1* | 11/2020 | Chowdhary | G06F 16/24578 |
| 2021/0163041 A1* | 6/2021 | Kojo | G06Q 50/10 |
| 2021/0233164 A1* | 7/2021 | Gaur | G06Q 30/0641 |
| 2021/0394662 A1* | 12/2021 | Deng | G06Q 50/30 |

FOREIGN PATENT DOCUMENTS

| | | |
|---|---|---|
| JP | 2020-013379 A | 1/2020 |
| JP | 2021-51431 A | 4/2021 |

* cited by examiner

INFORMATION PROCESSING APPARATUS FOR LENDING AND BORROWING VEHICLES BETWEEN AREAS, NON-TRANSITORY COMPUTER READABLE MEDIUM, AND INFORMATION PROCESSING METHOD

CROSS-REFERENCE TO RELATED APPLICATION

This application claims priority to Japanese Patent Application No. 2021-072058 filed on Apr. 21, 2021, the entire contents of which are incorporated herein by reference.

TECHNICAL FIELD

The present disclosure relates to an information processing apparatus, a program, and an information processing method.

BACKGROUND

A vehicle operation system that manages the operation of a plurality of vehicles, such as autonomous buses, is known.

For example, Patent Literature (PTL) 1 discloses a vehicle operation system that modifies an operation plan based on information on a secondary battery installed in each electric vehicle among a plurality of electric vehicles.

CITATION LIST

Patent Literature

PTL 1: JP 2020-13379 A

SUMMARY

When there is a period of high demand for vehicles in one area for which a vehicle dispatch center manages the operation plan of vehicles, such as autonomous buses, it may not be possible to meet the demand for that period using only the number of vehicles managed by the vehicle dispatch center.

It would be helpful to enable a vehicle dispatch center to respond flexibly to the demand for vehicles.

An information processing apparatus according to the present disclosure includes a controller configured to:

acquire, from a plurality of vehicle dispatch centers that each manage an operation plan for a specific area, the operation plan for each area;

determine, based on the acquired operation plans, whether a period of time exists, in a first area and a second area that are not adjacent, during which there is a surplus of vehicles in the first area and a shortage of vehicles in the second area; and generate, in a case in which the period of time is determined to exist, a vehicle movement plan such that a surplus vehicle in the first area is lent to a vehicle dispatch center that manages an operation plan for an area between the first area and the second area, and a vehicle dispatch center in the second area borrows a vehicle from the vehicle dispatch center that manages the operation plan for the area between the first area and the second area.

A program according to the present disclosure is configured to cause a computer to execute operations including:

acquiring, from a plurality of vehicle dispatch centers that each manage an operation plan for a specific area, the operation plan for each area;

determining, based on the acquired operation plans, whether a period of time exists, in a first area and a second area that are not adjacent, during which there is a surplus of vehicles in the first area and a shortage of vehicles in the second area; and generating, in a case in which the period of time is determined to exist, a vehicle movement plan such that a surplus vehicle in the first area is lent to a vehicle dispatch center that manages an operation plan for an area between the first area and the second area, and a vehicle dispatch center in the second area borrows a vehicle from the vehicle dispatch center that manages the operation plan for the area between the first area and the second area.

An information processing method according to the present disclosure is an information processing method in an information processing apparatus and includes:

acquiring, from a plurality of vehicle dispatch centers that each manage an operation plan for a specific area, the operation plan for each area;

determining, based on the acquired operation plans, whether a period of time exists, in a first area and a second area that are not adjacent, during which there is a surplus of vehicles in the first area and a shortage of vehicles in the second area; and generating, in a case in which the period of time is determined to exist, a vehicle movement plan such that a surplus vehicle in the first area is lent to a vehicle dispatch center that manages an operation plan for an area between the first area and the second area, and a vehicle dispatch center in the second area borrows a vehicle from the vehicle dispatch center that manages the operation plan for the area between the first area and the second area.

According to the present disclosure, a vehicle dispatch center can respond flexibly to the demand for vehicles.

DETAILED DESCRIPTION

An embodiment of the present disclosure is described below with reference to the drawings.

Figure 1:
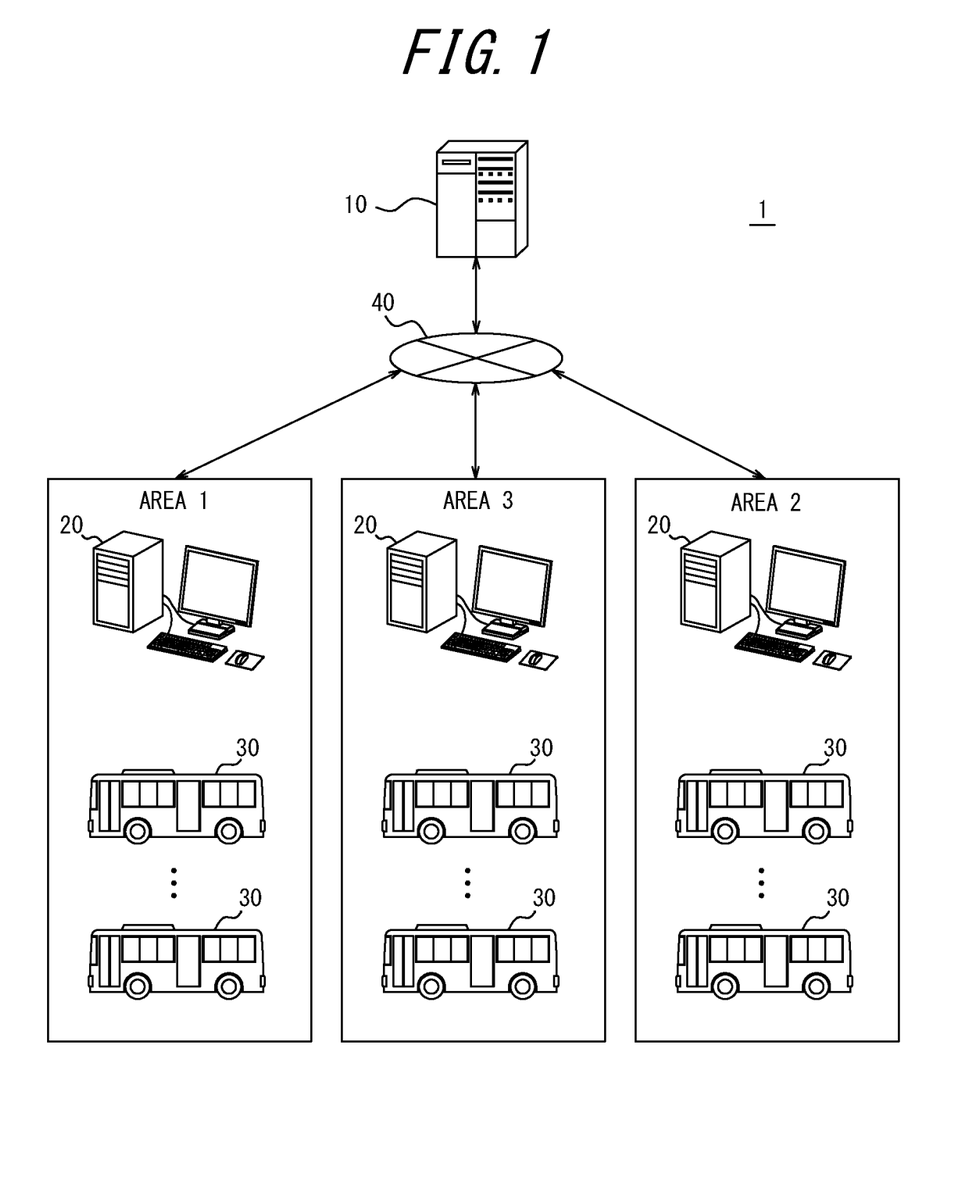
FIG. 1 is a diagram illustrating a configuration of an information processing system according to an embodiment of the present disclosure.

FIG. 1 is a diagram illustrating a configuration of an information processing system 1 according to an embodiment of the present disclosure. The configuration and outline of the information processing system 1 according to an embodiment of the present disclosure are described with reference to FIG. 1.

The information processing system 1 includes an information processing apparatus 10 and a terminal apparatus 20. The information processing apparatus 10 and the terminal apparatus 20 are communicably connected via a network 40. The network 40 may be a network including a mobile communication network, the Internet, and the like.

Although one information processing apparatus 10 is illustrated in FIG. 1, the number of information processing apparatuses 10 may be two or more. Also, although three terminal apparatuses 20 are illustrated in FIG. 1, the number of terminal apparatuses 20 may be two or less, or may be four or more.

In each of the areas 1 to 3 illustrated in FIG. 1, an operation plan for vehicles 30 is managed by a vehicle dispatch center. A vehicle dispatch center manages the operation plan for a specific area. For example, the vehicle dispatch center in area 1 manages the operation plan for the vehicles 30 in area 1, the vehicle dispatch center in area 2 manages the operation plan for the vehicles 30 in area 2, and the vehicle dispatch center in area 3 manages the operation plan for the vehicles 30 in area 3. Areas 1 to 3 each have a predetermined number of vehicles 30.

Area 1 and area 2 are non-adjacent areas. Area 3 is an area between area 1 and area 2. Area 3 is adjacent to both area 1 and area 2.

FIG. 1 illustrates the case of area 3 being between non-adjacent areas 1 and 2, but this is only an example. A plurality of areas may be located between the non-adjacent areas 1 and 2.

The vehicle dispatch center manages the operation plan for a plurality of vehicles 30. For example, the vehicle dispatch center in area 1 manages an operation plan for a plurality of vehicles 30 traveling within area 1. The same applies to area 2 and area 3. The vehicle dispatch center may manage an operation plan for a plurality of vehicles 30 that are different types of vehicles. For example, the number of passengers may differ by vehicle type.

The vehicle 30 may, for example, be a route bus, a sightseeing bus, or the like. The vehicle 30 may be any type of automobile, such as a gasoline-powered vehicle, a diesel-powered vehicle, an HEV (Hybrid Electric Vehicle), a PHEV (Plug-in Hybrid Electric Vehicle), a BEV (Battery Electric Vehicle), a FCEV (Fuel Cell Electric Vehicle), or the like. Driving of the vehicle 30 may be automated at any level. The automation level may, for example, be any one of Level 1 to Level 5 according to the level classification defined by the Society of Automotive Engineers (SAE).

The terminal apparatus 20 is a device used by a vehicle dispatch center to manage an operation plan. The terminal apparatus 20 may, for example, be installed in a facility of a vehicle dispatch center. The terminal apparatus 20 may, for example, be operated by an employee of the vehicle dispatch center.

From a plurality of vehicle dispatch centers that each manage an operation plan for a specific area, the information processing apparatus 10 acquires the operation plan for each area. In the example illustrated in FIG. 1, the information processing apparatus 10 acquires operation plans for areas 1 to 3 from the respective vehicle dispatch centers that manage the operation plans for areas 1 to 3.

Based on the acquired operation plans, the information processing apparatus 10 determines whether a period of time exists, in non-adjacent areas 1 and 2, during which there is a surplus of vehicles in one area and a shortage of vehicles in the other area.

The case of a period of time existing during which there is a surplus of vehicles 30 in area 1 and a shortage of vehicles 30 in area 2 is described as an example. A period of time during which there is a shortage of vehicles 30 in area 2 may, for example, occur when an increase in passengers is projected in area 2 during a certain period of time, and the number of vehicles 30 operating simultaneously is to be increased.

In this case, the information processing apparatus 10 determines that there is a period of time during which there is a surplus of vehicles 30 in area 1 and a shortage of vehicles 30 in area 2. The information processing apparatus 10 then generates a vehicle movement plan such that, during that period of time, a vehicle 30 in area 1 is lent to the vehicle dispatch center that manages the operation plan for area 3, and a vehicle 30 in area 3 is lent to the vehicle dispatch center that manages the operation plan for area 2.

The information processing apparatus 10 transmits the generated vehicle movement plan to the terminal apparatuses 20 in areas 1 to 3. The employees of the vehicle dispatch centers in areas 1 to 3 who confirm the vehicle movement plan received by the terminal apparatuses 20 can lend or borrow a vehicle 30 according to the received vehicle movement plan.

In this way, even in a case in which area 1, which has a surplus of vehicles 30, and area 2, which has a shortage of vehicles 30, are not adjacent to each other, the vehicle dispatch center in area 2 can borrow a vehicle 30 via area 3, which is between area 1 and area 2.

The information processing apparatus 10 can communicate with the terminal apparatus 20 via the network 40. The information processing apparatus 10 is, for example, a dedicated computer configured to function as a server. The information processing apparatus 10 may be a general purpose personal computer (PC).

The terminal apparatus 20 can communicate with the information processing apparatus 10 via the network 40. The terminal apparatus 20 may, for example, be a general purpose PC, a smartphone, or a tablet.

Figure 2:
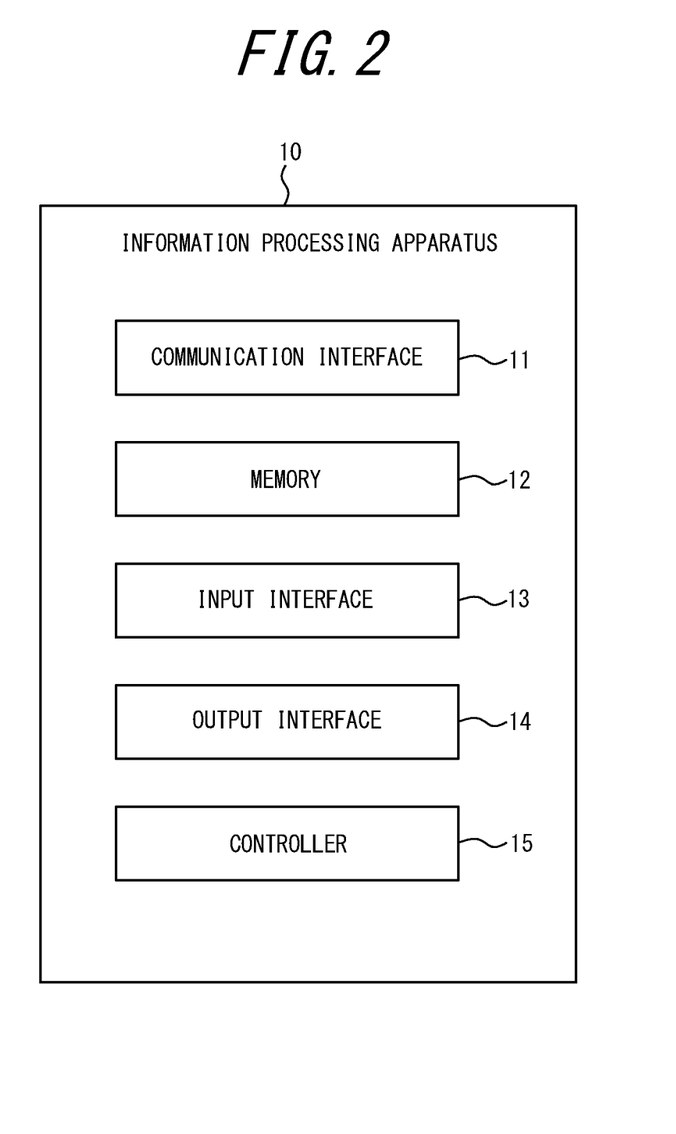
FIG. 2 is a block diagram illustrating a configuration of an information processing apparatus according to an embodiment of the present disclosure.

A configuration of the information processing apparatus 10 according to an embodiment of the present disclosure is described with reference to FIG. 2.

The information processing apparatus 10 includes a communication interface 11, a memory 12, an input interface 13, an output interface 14, and a controller 15.

The communication interface 11 includes a communication module connected to the network 40. For example, the communication interface 11 may include a communication module corresponding to a local area network (LAN). In an embodiment, the information processing apparatus 10 is connected to the network 40 via the communication interface 11. The communication interface 11 transmits and receives various information via the network 40. The communication interface 11 can communicate with the terminal apparatus 20 via the network 40.

The memory 12 is, for example, a semiconductor memory, a magnetic memory, an optical memory, or the like, but is not limited to these. The memory 12 may function as, for example, a main memory, an auxiliary memory, or a cache memory. The memory 12 stores any information used for operations of the information processing apparatus 10. For example, the memory 12 may store a system program, an application program, various types of information received by the communication interface 11, and the like.

The information stored in the memory 12 may be updated with information received from the network 40 via the communication interface 11, for example. A portion of the memory 12 may be installed externally to the information processing apparatus 10. In this case, the externally installed portion of the memory 12 may be connected to the information processing apparatus 10 via any appropriate interface.

The input interface 13 includes one or more input interfaces for detecting user input and acquiring input information based on user operation. For example, the input interface 13 includes, but is not limited to, a physical key, a capacitive key, a touch screen integrally provided with a display of the output interface 14, or a microphone that receives audio input.

The output interface 14 includes one or more output interfaces for outputting information to notify the user. For example, the output interface 14 includes, but is not limited to, a display for outputting information as images, a speaker for outputting information as audio, or the like.

The controller 15 includes at least one processor, at least one dedicated circuit, or a combination thereof. The processor is a general purpose processor, such as a central processing unit (CPU) or a graphics processing unit (GPU), or a dedicated processor specialized for particular processing. The dedicated circuit is, for example, a field-programmable gate array (FPGA) or an application specific integrated circuit (ASIC). The controller 15 executes processes related to operations of the information processing apparatus 10 while controlling components of the information processing apparatus 10.

Figure 3:
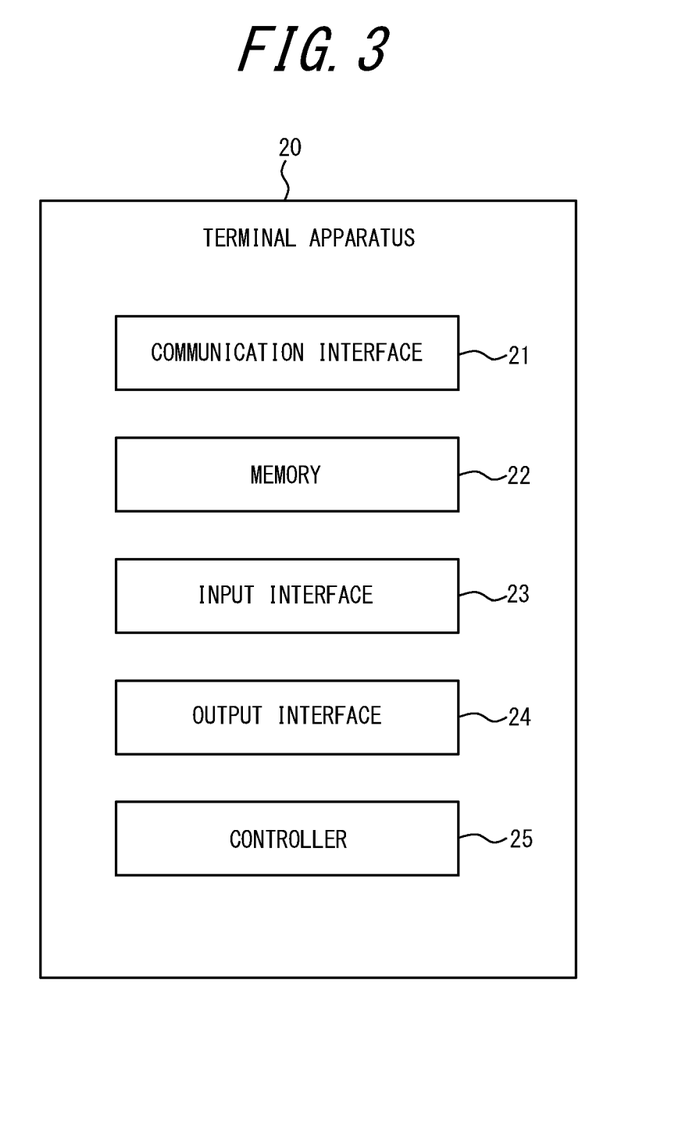
FIG. 3 is a block diagram illustrating a configuration of a terminal apparatus according to the embodiment of the present disclosure.

A configuration of the terminal apparatus 20 according to an embodiment of the present disclosure is described with reference to FIG. 3.

The terminal apparatus 20 includes a communication interface 21, a memory 22, an input interface 23, an output interface 24, and a controller 25.

The communication interface 21 includes a communication module connected to the network 40. For example, the communication interface 21 may include a communication module compliant with a LAN. In an embodiment, the terminal apparatus 20 is connected to the network 40 via the communication interface 21. The communication interface 21 transmits and receives various information via the network 40. The communication interface 21 can communicate with the information processing apparatus 10 via the network 40.

The memory 22 is, for example, a semiconductor memory, a magnetic memory, an optical memory, or the like, but is not limited to these. The memory 22 may function as, for example, a main memory, an auxiliary memory, or a cache memory. The memory 22 stores any information used for operations of the terminal apparatus 20. For example, the memory 22 may store a system program, an application program, various types of information received by the communication interface 21, and the like. The information stored in the memory 22 may be updated with information received from the network 40 via the communication interface 21, for example. A portion of the memory 22 may be installed externally to the terminal apparatus 20. In this case, the externally installed portion of the memory 22 may be connected to the terminal apparatus 20 via any appropriate interface.

The input interface 23 includes one or more input interfaces for detecting user input and acquiring input information based on user operation. The input interface 23 is, for example, a physical key, a capacitive key, a touch screen integrally provided with a display of the output interface 24, a microphone for receiving audio input, or the like, but is not limited to these.

The output interface 24 includes one or more output interfaces for outputting information to notify the user. For example, the output interface 24 includes, but is not limited to, a display for outputting information as images or a speaker for outputting information as audio.

The controller 25 includes at least one processor, at least one dedicated circuit, or a combination thereof. The processor is a general purpose processor such as a CPU or a GPU, or a dedicated processor that is dedicated to specific processing. The dedicated circuit is, for example, an FPGA or an ASIC. The controller 25 executes processes related to operations of the terminal apparatus 20 while controlling components of the terminal apparatus 20.

(Operations of Information Processing System)

Operations of the information processing system 1 illustrated in FIG. 1 are described with reference to FIGS. 1 to 3. A case in which there are three areas, i.e. area 1 to area 3 as illustrated in FIG. 1, is described as an example. Area 1 and area 2 are assumed not to be adjacent to each other. Area 3 is an area between area 1 and area 2. Area 3 is adjacent to area 1 and area 2.

The vehicle dispatch center for area 1 manages the operation plan for the vehicles 30 in area 1. Similarly, the vehicle dispatch centers for area 2 and area 3 manage the respective operation plans of the vehicles 30 in area 2 and area 3.

An employee of the vehicle dispatch center inputs the operation plan, to the input interface 23 of the terminal apparatus 20, for the vehicles 30 in the area for which the vehicle dispatch center is managing the operation plan. For example, an employee of the vehicle dispatch center for area 1 inputs an operation plan to the input interface 23 of the terminal apparatus 20 in area 1. The controller 25 transmits the operation plan inputted to the input interface 23 to the information processing apparatus 10 via the communication interface 21.

The operation plan includes the information necessary to plan the operation of the vehicles 30. For example, the operation plan may include information indicating the extent of the area covered by the operation plan, route information for each vehicle 30, information on a period of time when there is a surplus of vehicles 30, information on a period of time when there is a shortage of vehicles 30, and information on the vehicle type of each vehicle 30. Even when a vehicle 30 not in use is on standby in a garage, it is not necessarily the case that there is a surplus of vehicles 30. For example, if the vehicle 30 on standby in the garage is a vehicle 30 necessary for subsequent operation, then that vehicle 30 is not a surplus vehicle 30. If the vehicle 30 on standby in the garage need not be used for subsequent operation, then that vehicle 30 is a surplus vehicle 30.

The communication interface 11 of the information processing apparatus 10 receives the operation plan transmitted by the terminal apparatus 20. The controller 15 acquires the operation plan, transmitted by the terminal apparatus 20, via the communication interface 11. The controller 15 stores the acquired operation plan in the memory 12.

The vehicle dispatch center can thereby provide the information processing apparatus 10 with the operation plan of the area for which the vehicle dispatch center manages the operation plan.

An employee of the vehicle dispatch center may modify the operation plan according to the projected demand for the vehicles 30. In the case of modifying the operation plan, the employee of the vehicle dispatch center inputs the modified operation plan to the input interface 23 of the terminal apparatus 20. By the above-described processing, the modified operation plan is transmitted to the information processing apparatus 10, and the modified operation plan is stored in the memory 12 of the information processing apparatus 10.

Based on the operation plans acquired from the various areas, the controller 15 of the information processing apparatus 10 determines whether a period of time exists, in areas that are not adjacent, during which there is a surplus of vehicles 30 in one area and a shortage of vehicles 30 in the other area.

For example, it is assumed that a period of time exists, in areas 1 and 2 that are not adjacent, during which there is a surplus of vehicles 30 in area 1 and a shortage of vehicles 30 in area 2. In this case, the controller 15 determines that a period of time exists during which there is a surplus of vehicles 30 in area 1 and a shortage of vehicles 30 in area 2.

In a case in which the above-described period of time is determined to exist, the controller 15 generates a vehicle movement plan such that, during the period of time, a vehicle 30 that is a surplus vehicle in area 1 is lent to the vehicle dispatch center in area 3, and the vehicle dispatch center in area 2 borrows a vehicle 30 from the vehicle dispatch center in area 3.

By vehicles 30 being lent and borrowed based on this vehicle movement plan, the vehicle dispatch center in area 1 can easily lend a vehicle 30 that is a surplus vehicle to the vehicle dispatch center in area 3, since area 1 and area 3 are adjacent to each other. The vehicle dispatch center in area 2 can also easily borrow a vehicle 30 from the vehicle dispatch center in area 3.

At this time, area 3 may lend vehicles 30 to area 2 even if area 3 has neither a surplus nor a shortage of vehicles 30 during the above-described period of time. The reason is that area 3 can borrow, from area 1, vehicles 30 corresponding to the number of vehicles 30 that area 3 lends to area 2.

The controller 15 transmits the generated vehicle movement plan to the terminal apparatuses 20 in the respective areas via the communication interface 11.

The communication interface 21 of the terminal apparatus 20 receives the vehicle movement plan transmitted by the information processing apparatus 10. The controller 25 acquires the vehicle movement plan, transmitted by the information processing apparatus 10, via the communication interface 21. The controller 15 outputs the acquired vehicle movement plan via the output interface 24. Based on the vehicle movement plan outputted by the output interface 24, an employee of the vehicle dispatch center effects the movement of the vehicle 30, such as by lending a vehicle 30 to an adjacent area.

For example, in a case in which a vehicle 30 from area 1 is to be lent to area 3 and a vehicle 30 from area 3 is to be lent to area 2 in a certain period of time, the employee of the vehicle dispatch center in area 1 moves the vehicle 30 from area 1 to area 3 during the period of time. An employee of the vehicle dispatch center in area 3 will also move the vehicle 30 in area 3 to area 2 during the period of time.

At this time, in a case in which there is a vehicle 30 on standby for the next operation in the garage of area 3, the employee of the vehicle dispatch center of area 3 may lend the vehicle 30 on standby in the garage of area 3 to area 2 before a vehicle 30 is borrowed from area 1. The reason is that doing so will not interfere with the operation plan of area 3 as long as a vehicle 30 is borrowed from area 1 by the time the vehicle 30 on standby in the garage is to depart.

Movement of a vehicle 30 that is being lent may be accomplished by moving a vehicle 30 that is on standby in a garage in the area. For example, when a vehicle 30 in area 1 is to be lent to area 3, a vehicle 30 on standby in a garage in area 1 may be moved to area 3 and lent to area 3. This enables the vehicle 30 to be lent without significantly impacting the operation plan.

Alternatively, the movement of a vehicle 30 that is being lent may be accomplished by moving a vehicle 30 in operation to an adjacent area during operation. For example, in the case of lending a vehicle in area 1 to area 3, a vehicle 30 operating on a certain route in area 1 may be lent to area 3 when the vehicle 30 approaches area 3. This can reduce the distance that the vehicle 30 travels without carrying passengers. For example, this method of travel is effective when the end of the route in area 1 is close to the start of the route in area 3.

Upon receiving the operation plan from the vehicle dispatch center, the controller 15 of the information processing apparatus 10 may grant an incentive to the terminal apparatus 20 of the vehicle dispatch center. The incentive may, for example, be coupons usable to purchase products or various discount coupons.

By granting an incentive, the controller 15 can increase the motivation for the vehicle dispatch center to provide the operation plan. If more vehicle dispatch centers provide operation plans as a result of increased motivation, it becomes easier for the information processing apparatus 10 to find a vehicle dispatch center that can provide a vehicle 30 in a period of time during which there is a shortage of vehicles 30 in an area.

When a vehicle 30 is lent or borrowed, the controller 15 of the information processing apparatus 10 may grant an incentive to the terminal apparatus 20 of the vehicle dispatch center that lends the vehicle 30.

By granting an incentive, the controller 15 can increase the motivation for the vehicle dispatch center to lend the vehicle 30. If more operation plans indicating a surplus of vehicles 30 are acquired as a result of increased motivation, it becomes easier for the information processing apparatus 10 to find a vehicle dispatch center that can provide a vehicle 30 in a period of time during which there is a shortage of vehicles 30 in an area.

The controller 15 of the information processing apparatus 10 may vary the incentive to be granted to the terminal apparatus 20 of the vehicle dispatch center according to the time when the operation plan is provided by the vehicle dispatch center. For example, the controller 15 may increase the incentive the earlier the operation plan is provided relative to the period of time when the vehicle 30 is actually lent or borrowed.

By varying the incentive in this way, the controller 15 can increase the motivation for the vehicle dispatch center to provide the operation plan earlier.

If operation plans are provided earlier as a result of increased motivation, it becomes easier to find a vehicle dispatch center that can provide a vehicle 30 in a period of time during which there is a shortage of vehicles 30 in an area, since the information processing apparatus 10 has greater leeway with regard to the period of time.

In FIG. 1, a case in which one area 3 is located between the non-adjacent areas 1 and 2 is described as an example, but a plurality of areas may be located between the non-adjacent areas 1 and 2.

Figure 4:
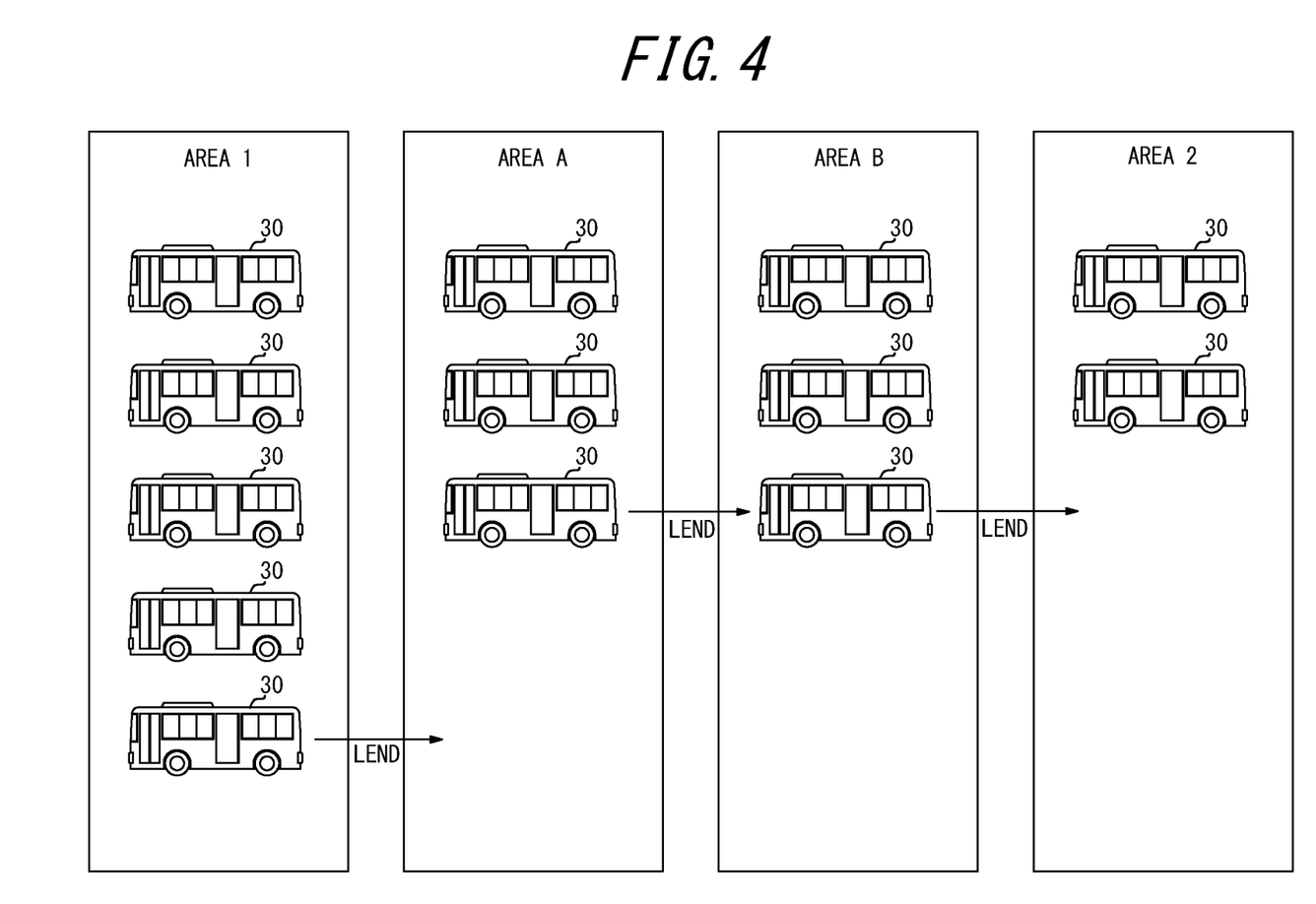
FIG. 4 is a diagram illustrating an example of a case in which there is a plurality of areas between non-adjacent areas.

FIG. 4 illustrates an example of two areas being located between the non-adjacent areas 1 and 2. In the example illustrated in FIG. 4, area A and area B are located between area 1 and area 2. Area A is adjacent to area 1 and area B. Area B is adjacent to area A and area 2.

Explanation is provided below with reference to the example in FIG. 4. It is assumed that if there are three vehicles 30, then area 1, area 2, area A, and area B can operate in accordance with an operation plan with neither surplus nor shortage during a certain period of time.

In the example illustrated in FIG. 4, it is assumed that during a certain period of time, area 1 has five vehicles 30, area 2 has two vehicles 30, and area A and area B have three vehicles 30. In other words, during this period of time, area 1 has two surplus vehicles 30. Area 2 is short one vehicle 30. Area A and Area B have neither a surplus nor a shortage of vehicles 30.

In this case, the controller 15 of the information processing apparatus 10 generates a vehicle movement plan such that area 1 lends a vehicle 30 to area A, area A lends a vehicle 30 to area B, and area B lends a vehicle 30 to area 2. In other words, the controller 15 generates a vehicle movement plan such that vehicles 30 are lent and borrowed in domino fashion in the plurality of areas between the non-adjacent areas 1 and 2.

In FIG. 4, the case of two areas being located between non-adjacent areas 1 and 2 is illustrated as an example, but three or more areas may be located between the non-adjacent areas 1 and 2.

In this way, a vehicle movement plan such that vehicles 30 are lent and borrowed in domino fashion in a plurality of areas between the non-adjacent areas 1 and 2 is generated. Therefore, even when area 1, which has a surplus vehicle 30, and area 2, which has a shortage of vehicles 30, are far apart, area 2 can borrow a vehicle 30 from the adjacent area B.

Figure 5:
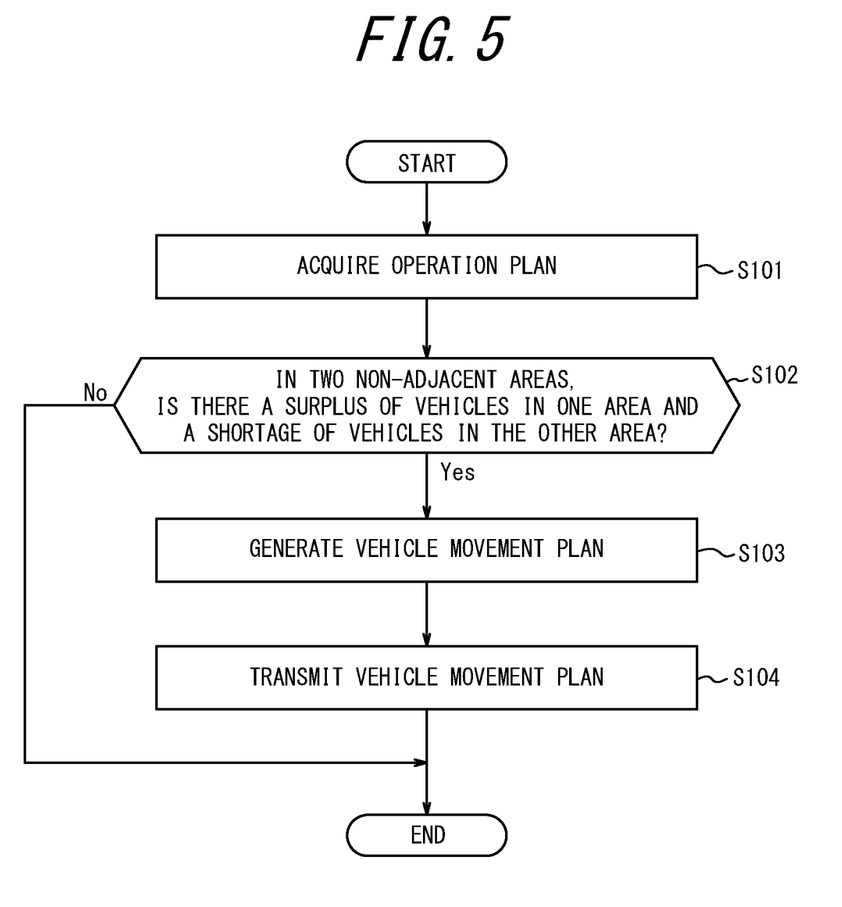
FIG. 5 is a flowchart illustrating operations of an information processing system according to an embodiment of the present disclosure.

Operations of the information processing system 1 are described with reference to the flowchart in FIG. 5.

In step S101, the controller 15 of the information processing apparatus 10 acquires the operation plan, for each area, transmitted by the terminal apparatuses 20.

In step S102, the controller 15 determines whether a period of time exists, in two non-adjacent areas, during which there is a surplus of vehicles 30 in one area and a shortage of vehicles 30 in the other area.

In case in which the determination is Yes in step S102, the controller 15 proceeds to step S103. In a case in which the determination is No in step S102, the controller 15 terminates the process.

In step S103, the controller 15 generates a vehicle movement plan. For example, in a case in which the one area with a surplus of vehicles 30 is area 1 and the other area with a shortage of vehicles 30 is area 2 in step S102, the controller 15 generates a vehicle movement plan such that a vehicle 30 that is a surplus vehicle in area 1 is lent to the vehicle dispatch center in area 3, and the vehicle dispatch center in area 2 borrows a vehicle 30 from area 3. Here, area 3 is an area located between the non-adjacent areas 1 and 2.

In step S104, the controller 15 transmits the generated vehicle movement plan to the terminal apparatuses 20 in the respective areas.

As described above, in the information processing apparatus 10 according to the present embodiment, the controller 15 determines whether a period of time exists, in non-adjacent areas 1 and 2, during which there is a surplus of vehicles 30 in one area and a shortage of vehicles 30 in the other area. For example, in a case in which it is determined that a period of time exists such that there is a surplus of vehicles 30 in area 1 and a shortage of vehicles 30 in area 2, the controller 15 generates a vehicle movement plan such that a surplus vehicle in area 1 is lent to the vehicle dispatch center that manages the operation plan in area 3 between areas 1 and 2, and the vehicle dispatch center in area 2 borrows a vehicle 30 from the vehicle dispatch center that manages the operation plan in area 3. Even though area 2 is not adjacent to area 1, which has the surplus of vehicles 30, the vehicle dispatch center in area 2 can thus borrow a vehicle 30 from area 3 between areas 1 and 2. Therefore, according to the information processing apparatus 10 of the present embodiment, a vehicle dispatch center can respond flexibly to the demand for vehicles 30.

The present disclosure is not limited to the embodiment described above. For example, a plurality of blocks described in the block diagrams may be integrated, or a block may be divided. Instead of executing a plurality of steps described in the flowcharts in chronological order in accordance with the description, the plurality of steps may be executed in parallel or in a different order according to the processing capability of the apparatus that executes each step, or as required. Other modifications can be made without departing from the spirit of the present disclosure.

For example, some of the processing operations executed in the information processing apparatus 10 in the above embodiment may be executed in the terminal apparatus 20. Also, some of the processing operations executed in the terminal apparatus 20 in the above embodiment may be executed in the information processing apparatus 10.

For example, a configuration that causes a general purpose electronic device such as a smartphone, a computer, or the like to function as the information processing apparatus 10 according to the above embodiment is possible. Specifically, a program in which processes for realizing the functions of the information processing apparatus 10 or the like according to the embodiment are written may be stored in a memory of the electronic device, and the program may be read and executed by a processor of the electronic device. Accordingly, in an embodiment, the present disclosure can also be implemented as a program executable by a processor.

For example, the case of the vehicle 30 being a route bus or a sightseeing bus has been described as an example in the above embodiment, but the vehicle 30 may be any type of vehicle.

For example, the case of one terminal apparatus 20 managing the operation plan for one area has been described as an example in the above embodiment, but one terminal apparatus 20 may manage operation plans for a plurality of areas.

The invention claimed is:

1. An information processing system comprising
a plurality of terminal apparatuses corresponding to a plurality of vehicle dispatch centers that each manage an operation plan for a specific area, each terminal apparatus comprising an input configured to collect operation information from employees of the plurality of vehicle dispatch centers and an output configured to display vehicle movement information to the employees of the plurality of vehicle dispatch centers; and
an information processing apparatus configured to communicate with the plurality of terminal apparatuses, wherein
the information processing apparatus comprises a controller is configured to:
acquire, from the plurality of terminal apparatuses of the plurality of vehicle dispatch centers, the operation plan for each area;

determine, based on the acquired operation plans, whether a period of time exists, in a first area and a second area that are not adjacent and are separated by a plurality of intermediate areas, during which there is a surplus of vehicles in the first area and a shortage of vehicles in the second area;

generate, in a case in which the period of time is determined to exist, a vehicle movement plan such that a surplus vehicle in the first area is lent to a vehicle dispatch center that manages the operation plan for a first intermediate area of the plurality of intermediate areas between the first area and the second area, and the vehicle dispatch center of the second area borrows a vehicle from the vehicle dispatch center that manages the operation plan for a last intermediate area of the plurality of intermediate areas between the first area and the second area, wherein intermediate vehicles are lent and borrowed in a domino fashion between the plurality of intermediate areas such that each area of the plurality of intermediate areas borrows a vehicle from a first adjacent area and lends a vehicle to a second adjacent area; and transmit, to each output of each of the plurality of terminal apparatuses of the plurality vehicle dispatch centers associated with the vehicle movement plan, the vehicle movement plan to notify the employees of the plurality of vehicle dispatch centers associated with the vehicle movement plan and to implement the vehicle movement plan by moving the surplus vehicle and the intermediate vehicles in accordance with the vehicle movement plan.

2. The information processing system of claim 1, wherein during the period of time, there is neither a surplus nor a shortage of vehicles in the area between the first area and the second area.

3. The information processing system of claim 1, wherein the controller grants an incentive to the terminal apparatuses of the plurality of vehicle dispatch centers that provided the operation plan.

4. The information processing system of claim 3, wherein the controller varies the incentive according to when the operation plan is provided.

5. A non-transitory computer-readable medium storing a program configured to cause a computer to execute operations, the operations comprising:

acquiring, from a plurality of terminal apparatuses corresponding to a plurality of vehicle dispatch centers that each manage an operation plan for a specific area, the operation plan for each area;

determining, based on the acquired operation plans, whether a period of time exists, in a first area and a second area that are not adjacent and are separated by a plurality of intermediate areas, during which there is a surplus of vehicles in the first area and a shortage of vehicles in the second area;

generating, in a case in which the period of time is determined to exist, a vehicle movement plan such that a surplus vehicle in the first area is lent to a vehicle dispatch center that manages an operation plan for an area between the first area and the second area, and a vehicle dispatch center in the second area borrows a vehicle from the vehicle dispatch center that manages the operation plan for the area between the first area and the second area; and transmitting, to an output of each of the plurality of terminal apparatuses of the plurality of vehicle dispatch centers associated with the vehicle movement plan, the vehicle movement plan to notify employees of the plurality of vehicle dispatch centers associated with the vehicle movement plan and to implement the vehicle movement plan by moving the surplus vehicle and the intermediate vehicles in accordance with the vehicle movement plan.

6. The non-transitory computer readable medium of claim 5, wherein during the period of time, there is neither a surplus nor a shortage of vehicles in the area between the first area and the second area.

7. The non-transitory computer readable medium of claim 5, the operations further comprising granting an incentive to the terminal apparatuses of the plurality of vehicle dispatch centers that provided the operation plan.

8. The non-transitory computer readable medium of claim 7, the operations further comprising varying the incentive according to when the operation plan is provided.

9. An information processing method in an information processing apparatus, the information processing method comprising:

acquiring, from a plurality of terminal apparatuses of a plurality of vehicle dispatch centers that each manage an operation plan for a specific area, the operation plan for each area;

determining, based on the acquired operation plans, whether a period of time exists, in a first area and a second area that are not adjacent and are separated by a plurality of intermediate areas, during which there is a surplus of vehicles in the first area and a shortage of vehicles in the second area;

generating, in a case in which the period of time is determined to exist, a vehicle movement plan such that a surplus vehicle in the first area is lent to a vehicle dispatch center that manages an operation plan for a first intermediate area of the plurality of intermediate areas between the first area and the second area, and the vehicle dispatch center of the second area borrows a vehicle from the vehicle dispatch center that manages the operation plan for a last intermediate area of the plurality of intermediate areas between the first area and the second area, wherein intermediate vehicles are lent and borrowed in a domino fashion between the plurality of intermediate areas such that each area of the plurality of intermediate areas borrows a vehicle from a first adjacent area and lends a vehicle to a second adjacent area; and transmitting, to an output of each of the plurality of terminal apparatuses of the plurality of vehicle dispatch centers associated with the vehicle movement plan, the vehicle movement plan to notify employees of the plurality of vehicle dispatch centers associated with the vehicle movement plan and to implement the vehicle movement plan by moving the surplus vehicle and the intermediate vehicles in accordance with the vehicle movement plan.

10. The information processing method of claim 9, wherein during the period of time, there is neither a surplus nor a shortage of vehicles in the area between the first area and the second area.

11. The information processing method of claim 9, further comprising granting an incentive to the terminal apparatuses of the plurality of vehicle dispatch centers that provided the operation plan.

* * * * *